United States Patent
Ihara et al.

(10) Patent No.: US 8,961,762 B2
(45) Date of Patent: Feb. 24, 2015

(54) METHOD FOR SEPARATING NANOCARBON MATERIAL, SEPARATION DEVICE, AND SEPARATED NANOCARBON DISPERSION SOLUTION

(75) Inventors: Kazuki Ihara, Tokyo (JP); Fumiyuki Nihey, Tokyo (JP)

(73) Assignee: NEC Corporation, Tokyo (JP)

( * ) Notice: Subject to any disclaimer, the term of this patent is extended or adjusted under 35 U.S.C. 154(b) by 564 days.

(21) Appl. No.: 13/380,377

(22) PCT Filed: Jun. 23, 2010

(86) PCT No.: PCT/JP2010/060627
§ 371 (c)(1),
(2), (4) Date: Dec. 22, 2011

(87) PCT Pub. No.: WO2010/150808
PCT Pub. Date: Dec. 29, 2010

(65) Prior Publication Data
US 2012/0103809 A1  May 3, 2012

(30) Foreign Application Priority Data
Jun. 23, 2009  (JP) ................................. 2009-148861

(51) Int. Cl.
*G01N 27/447* (2006.01)
*G01N 27/453* (2006.01)
(Continued)

(52) U.S. Cl.
CPC .................. *B01D 57/02* (2013.01); *B82Y 30/00* (2013.01); *B82Y 40/00* (2013.01); *C01B 31/02* (2013.01); *C01B 31/026* (2013.01); *C01B 31/0266* (2013.01); *C01B 31/0293* (2013.01)
USPC ............ 204/450; 204/618; 204/467; 204/600

(58) Field of Classification Search
USPC .................................. 204/467, 618, 450, 600
See application file for complete search history.

(56) References Cited

U.S. PATENT DOCUMENTS 7,074,310 B2 *  7/2006  Smalley et al. ............... 204/450
7,572,426 B2 *  8/2009  Strano et al. ............... 423/447.1
(Continued)

FOREIGN PATENT DOCUMENTS

JP          62-231153 A  * 10/1987 ............. G01N 27/26
JP          2008-508183 A     3/2008
(Continued)

OTHER PUBLICATIONS

Suárez et al. "Separation of carbon nanotubes in aqueous medium by capillary electrophoresis," Journal of Chromatography A, 1128 (2006) 282-289.*
(Continued)

*Primary Examiner* — Alex Noguerola
(74) *Attorney, Agent, or Firm* — Sughrue Mion, PLLC

(57) ABSTRACT

A method for separating a nanocarbon material includes a step in which a dispersion solution of the nanocarbon material which is dispersed into nanocarbon micelle groups having a plurality of different electric charges, and a retaining solution having a different specific gravity from the nanocarbon material, are introduced into an electrophoresis tank to form a layered state disposed in layers in a predetermined direction; and a step separating the nanocarbon micelle groups into at least two nanocarbon micelle groups by means of applying direct current voltage in series across the dispersion solution and the retaining solution which had both been introduced and disposed in layers.

20 Claims, 11 Drawing Sheets

(51) Int. Cl.
  B01D 57/02   (2006.01)
  B82Y 30/00   (2011.01)
  B82Y 40/00   (2011.01)
  C01B 31/02   (2006.01)

(56) References Cited

U.S. PATENT DOCUMENTS

2008/0260616 A1   10/2008   Tour et al.
2010/0189626 A1   7/2010    Tanaka et al.

FOREIGN PATENT DOCUMENTS

JP    2008-266112 A      11/2008
JP    2008-285387 A      11/2008
WO    WO 2006/013788 A1   2/2006

OTHER PUBLICATIONS

Vectcher et al., Electrophoretic Fractionation of Carbon Nanotube Dispersions on Agarose Gels, International Journal of Nanoscience vol. 6, No. 1 (2007) 1-7.*
JPO English language abstract of Hidehiko Fuji JP 62-231153 A.*
Masato Sano et al., "Chokuryn Denchakuhoo Mochiita Handotai to Kinzoku Tanso CNT no Bunri", Dai 52 Kai Extended Abstracts, Japan Society of Applied Physics and Related Societies, Mar. 29, 2005, p. 587, vol. 52, No. 1.
Michael S. Arnold et al., "Sorting Carbon Nanotubes by Electronic Structure Using Density Differentiation", Nature Publishing Group, Oct. 2006, pp. 60-65, vol. 1.
Ming Zheng et al., "Structure-Based Carbon Nanotube Sorting by Sequence-Department DNA Assembly", Science, ISSN: 0036-8075, Nov. 28, 2003, pp. 1545-1548, vol. 302.
Ralph Krupke et al., "Separation of Metallic from Semiconducting Single-Walled Carbon Nanotubes", Science, ISSN: 0036-8075, Jul. 18, 2003, pp. 344-347, vol. 301.
Ralph Krupke et al., "Thin Films of Metallic Carbon Nanotubes Prepared by Dielectrophoresis", Advanced Materials, 2006, pp. 1468-1470, vol. 18.
Takeshi Tanaka et al., "Simple and Scalable Gel-Based Separation of Metallic and Semiconducting Carbon Nanotubes", American Chemical Society, 2009, pp. 1497-1500, vol. 9, No. 4.
Yoshiakazu Wakisaka et al., "Denkai Ni Yoru Kinzoku to Handitai Tanso Carbon Nanotube No Bunri", Dai 66 Kai Extended Abstracts; Japan Society of Applied Physics, Sep. 7, 2005, p. 419, vol. 66, No. 1.

* cited by examiner

METHOD FOR SEPARATING NANOCARBON MATERIAL, SEPARATION DEVICE, AND SEPARATED NANOCARBON DISPERSION SOLUTION

CROSS REFERENCE TO RELATED APPLICATIONS

This application is a National Stage of International Application No. PCT/JP2010/060627 filed on Jun. 23, 2010, which claims priority from Japanese Patent Application No. 2009-148861, filed on Jun. 23, 2009, the contents of all of which are incorporated herein by reference in their entirety.

This invention relates to a method for separating nanocarbon material, a separation device and a separated nanocarbon dispersion solution.

TECHNICAL FIELD

Background

Carbon materials having sizes in the range of nanometer are recently expected to be used as new materials by taking advantage of their mechanical, electrical or chemical properties. Especially, a single-walled carbon nanotube (SWCNT) is a nanocarbon material having excellent electrical properties and is expected to be used as an electronic material of the next generation. It is known that the SWCNT is classified into two groups, each of which has different characteristics of a metallic property and a semiconducting property determined by a diameter of the tube and a degree of rolling. When single-walled carbon nanotubes (SWCNT) are synthesized by using a known synthesizing method at present, a mixed SWCNTs material is obtained in which SWCNT having a metallic property (metallic SWCNT) and SWCNT having a semiconducting property (semiconducting SWCNT) are mixed in the statistical ratio 1:2.

Many techniques are disclosed to separate such mixed SWCNTs into each SWCNT. For separating the semiconducting SWCNT and the metallic SWCNT, following methods are proposed such as; (1) a method for separating a semiconducting SWCNT using a dielectrophoresis method (Non-Patent Document 1), (2) a separation method using a density-differentiation centrifugation (Non-Patent Document 2), (3) a separation method using an ion-adsorption chromatography by DNA wrapping (Non-Patent Document 3), (4) a separation method using a gel-electrophoresis (Patent Document 1), and (5) a method for separating semiconducting/metallic SWCNTs using an adsorption to a gel (Non-Patent Document 4).

On the other hand, in the semiconductor field, a thin film transistor (TFT) using an amorphous or polycrystalline silicon as a semiconductor film is known and is put to practical use as a switching element for an active-matrix liquid display, and the like.

Recently it is investigated to use SWCNT as a material for semiconductor film of a TFT. For example, Patent Document 1 discloses an example of a TFT having a thin film containing SWCNT. An advantage of such a TFT using SWCNT is that a fabrication process can be carried out in a lower temperature compared with that of a TFT using an amorphous or polycrystalline silicon. As a result, it is expected to have many advantageous effects such as weight saving or cost saving of a device, for example, because it becomes possible to form a circuit on a plastic substrate.

[Patent Document 1] Japanese Patent Kokai Publication No. JP-P2008-285387A
[Non-Patent Document 1] Ralph Krupke et al., "Thin Films of Metallic Carbon Nanotubes Prepared by Dielectrophoresis", Advanced Materials 18 (2006), pp. 1468-1470.
[Non-Patent Document 2] Michael S. Arnold et al., "Sorting carbon nanotubes by electronic structure using density differentiation", Nature Nanotechnology 1 (2006), pp. 60-65.
[Non-Patent Document 3] Ming Zheng et al., "Structure-Based Carbon Nanotube Sorting by Sequence-Dependent DNA Assembly", Science 302 (2003), pp. 1545-1548.
[Non-Patent Document 4] Takeshi Tanaka et al., "Simple and Scalable Gel-Based Separation of Metallic and Semiconducting Carbon Nanotubes", Nano Letters 9 (2009), pp. 1497-1500.

The entire disclosures of Patent Document 1 and Non-Patent Documents 1 to 4 are incorporated herein by reference thereto. The following analyses are given by the present invention.

As explained above, a SWCNT material as a kind of nanocarbon material includes two kinds of SWCNTs having different properties, which are metallic SWCNT and semiconducting SWCNT, in the statistical ratio 1:2. This may cause degradation of electronic characteristics when SWCNT material is used as an electronic material. For example, when SWCNT material is used as a semiconductor film of a TFT, degradation of electronic characteristics such as short-circuit or degradation of on/off property may occur due to metallic SWCNT.

Therefore, it is necessary to separate metallic SWCNT and semiconducting SWCNT and use separately. However, the methods for separating semiconducting SWCNT and metallic SWCNT explained above were difficult to separate easily in large amounts because of the reasons indicated by Table 1, and thus industrial application was difficult. In Table 1, the symbols ⊚, O, Δ and X are arranged in order of good results. That is, ⊚ indicates the best result and X indicates the worst result.

TABLE 1

|  | Dielectro-phoresis | Density-differentiation centrifugation | DNA wrapping | Gel electro-phoresis | Gel adsorption |
|---|---|---|---|---|---|
| Mass production | X | X | X | X | Δ |
| Operability | X | X | X | Δ | O |
| Cost | X | X | Δ | O | ⊚ |

It is an object of the present invention to provide a method for easily and efficiently separating semiconducting SWCNT and metallic SWCNT selectively in large amounts from a mix-dispersed material of nanocarbon micelle groups having a plurality of electric charges such as, for example, a material of single walled carbon nanotube (SWCNT) in which semiconducting SWCNT and metallic SWCNT are mix-dispersed, a separation device and separated dispersion solution.

At first, the way the present invention has completed will be explained. The inventors had found that a monodisperse solution of SWCNT can be held in a layered state by adjusting a surfactant concentration of a surfactant solution and introducing a monodisperse solution of SWCNT slowly into the surfactant solution. The inventors had also found that the monodisperse solution layer of SWCNT is held at a position determined by a difference in specific gravity between the single walled carbon SWCNT micelle and the surfactant solution.

The inventors had tried to separate the SWCNTs in the monodisperse solution of SWCNT using a non-carriage electrophoresis, whose driving force is a resultant (combined) force of buoyant force caused by a difference in specific gravity of the SWCNT micelle and the surfactant solution as a retaining solution and the electrophoresis force caused by an electric field applied to each SWCNT micelles. And the inventors had found that only SWCNT micelle having a specified electric charge can be selectively separated easily and efficiently in large amounts by controlling the difference of specific gravity and the strength of the electric field of this separation method. The retaining solution is not necessarily a surfactant solution.

The present invention of a separation method for a nanocarbon material can solve the problem above explained by using an electrophoresis, the driving force of which is a resultant force of buoyant force caused by a difference in specific gravity of the SWCNT micelle and a retaining solution and the electrophoresis force of the nanocarbon micelle caused by an electric field applied to each SWCNT micelles.

According to a first aspect of the present invention, there is provided a method for separating a nanocarbon material including a step of introducing a dispersion solution of a nanocarbon material that is dispersed into nanocarbon micelle groups having a plurality of different electric charges and a retaining solution having a different specific gravity from that of the nanocarbon material into an electrophoresis tank to form a layered state disposed in layers in a predetermined direction, and a step of separating the nanocarbon micelle groups into at least two nanocarbon micelle groups by applying direct current voltage in series across the dispersion solution and the retaining solution that had both been introduced and disposed in layers. By applying voltage, a mixed solution of nanocarbon micelle groups can be separated into at least two nanocarbon micelle groups based on a difference of a resultant force that is composed of a moving force determined by a difference between a specific gravity of the retaining solution and that of the nanocarbon material (nanocarbon micelle groups) and an electrophoresis force determined by the electric field and the electric charge.

According to the present invention, it becomes possible industrially, from a nanocarbon material containing semiconducting SWCNT and metallic SWCNT, for example, to separate the semiconducting SWCNT and the metallic SWCNT easily and efficiently in large amount.

According to a second aspect of the present invention, there is provided a selective separation device of a nanocarbon material. The device includes an electrophoresis channel portion, an inlet portion so as to introduce a dispersion solution of a nanocarbon material that is dispersed into nanocarbon micelle groups having a plurality of different electric charges and a retaining solution having a different specific gravity from that of the nanocarbon material into the electrophoresis channel portion in layers, and at least two electrodes disposed opposingly so as to apply direct current voltage in series across the dispersion solution and the retaining solution that had both been introduced in layers. By providing an additional electrode between the opposing electrodes at both ends, it becomes possible to form a different electric gradient in the same channel.

According to a third aspect of the present invention, there is provided a dispersion solution of a nanocarbon material that is selectively separated by a method for separating a nanocarbon material including a step of introducing a dispersion solution of a nanocarbon material that is dispersed into nanocarbon micelle groups having a plurality of different electric charges and a retaining solution having a different specific gravity from that of the nanocarbon material into an electrophoresis tank to form a layered state disposed in layers in a predetermined direction, and a step of separating the nanocarbon micelle groups into at least two nanocarbon micelle groups by applying direct current voltage in series across the dispersion solution and the retaining solution that had both been introduced and disposed in layers.

PREFERRED MODES

Figure 1:
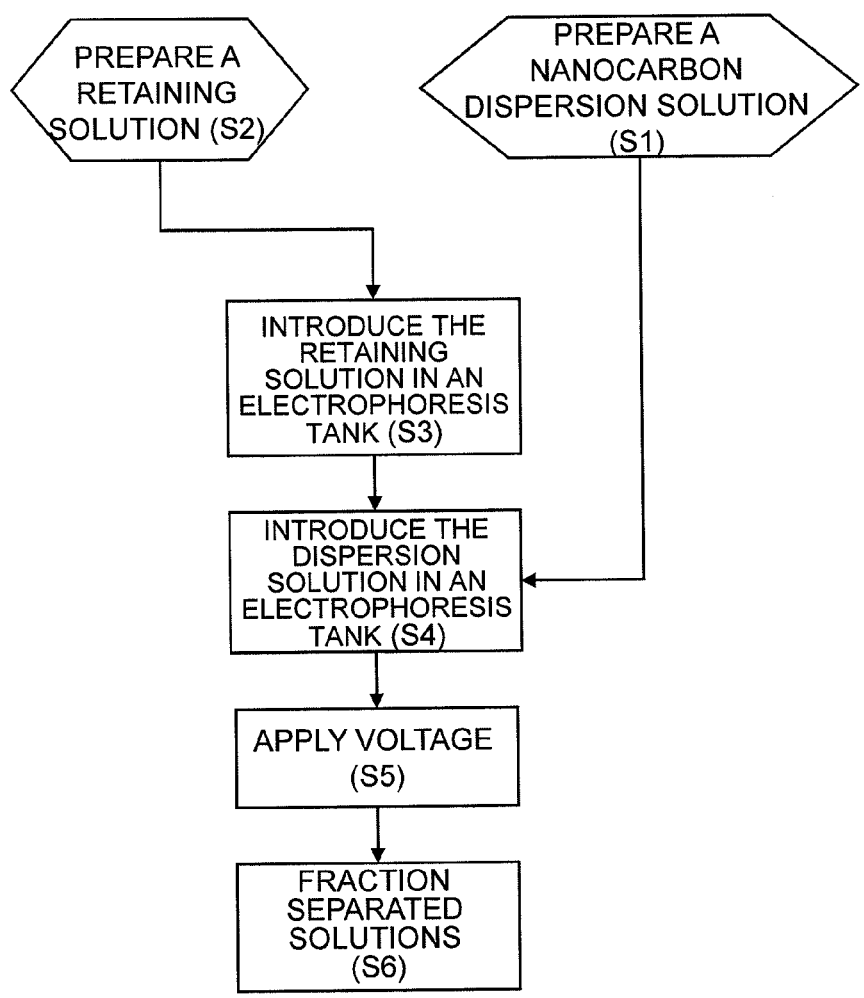
FIG. 1 is a flowchart indicating a separation method and a producing method according to an example of the present invention.

With respect to a first aspect, it is preferred that the step of introducing the dispersion solution and the retaining solution in layers includes a step of preparing the dispersion solution and the retaining solution, a step of introducing the retaining solution into the electrophoresis tank, and then a step of introducing the dispersion solution into the electrophoresis tank.

It is preferred that the predetermined direction is a direction parallel to gravity or centrifugal force. That is because it is suitable to utilize a resultant force of buoyant force and electromagnetic force.

It is preferred that each of the retaining solution and the dispersion solution includes a component selected from a group consisting of water, heavy water, organic solvent and ionic liquid as a solvent component.

It is preferred that the retaining solution and the dispersion solution further includes a surfactant as an adjuvant agent for dispersion.

The nanocarbon material may be a multi-walled carbon nanotube, a two-walled (double-walled) carbon nanotube or a single-walled carbon nanotube.

It is preferred that the nanocarbon micelle groups are composed of a micelle group including a semiconducting single-walled carbon nanotube and a micelle group including a metallic single-walled carbon nanotube.

It is preferred that a number of the electrodes of the electrophoresis tank is two. However, it is possible to use three electrodes or more.

It is preferred that the dispersion solution is introduced between an upper layer of the retaining solution and an electrode at a highest position.

It is preferred that the dispersion solution is introduced between a lower layer of the retaining solution and an electrode at a lowest position.

It is preferred that the dispersion solution is introduced at an intervening position of the retaining solution disposed between an electrode at a highest position and an electrode at a lowest position. That means, it is preferred to dispose the dispersion solution between an upper layer of the retaining solution and a lower layer of the retaining solution.

With respect to a second aspect, it is preferred that at least one part of the electrophoresis channel portion is disposed in a direction parallel to gravity or centrifugal force.

The nanocarbon material may be a multi-walled carbon nanotube, a two-walled carbon nanotube or a single-walled carbon nanotube.

It is preferred that the nanocarbon micelle groups are composed of a micelle group including a semiconducting single-walled carbon nanotube and a micelle group including a metallic single-walled carbon nanotube.

It is preferred that the opposing electrodes are two electrodes which are opposing to each other.

It is preferred that the inlet portion is disposed so as to introduce the dispersion solution between an upper layer of the retaining solution and an electrode at a highest position.

It is preferred that the inlet portion is disposed so as to introduce the dispersion solution between a lower layer of the retaining solution and an electrode at a lowest position.

It is preferred that the inlet portion is disposed so as to introduce the dispersion solution at an intervening position of the retaining solution disposed between an electrode at a highest position and an electrode at a lowest position.

With respect to a third aspect, the nanocarbon material may be a multi-walled carbon nanotube, a two-walled carbon nanotube or a single-walled carbon nanotube.

It is preferred that the nanocarbon micelle groups are composed of a micelle group including a semiconducting single-walled carbon nanotube and a micelle group including a metallic single-walled carbon nanotube.

Exemplary embodiments of the present invention will be explained in detail with reference to the drawings.

FIG. 1 is a flowchart for explaining a method for separating a nanocarbon material and for producing a separated nanocarbon material solution according to an example of the present invention. The method of this example can separate a nanocarbon material by carrying out steps S1 to S6 of the flowchart.

At first, as a first step (S1), a dispersion solution in which nanocarbon micelle groups that have a distribution of at least two electric charges and a second specific gravity are dispersed is prepared. Next, as a second step (S2), a retaining solution having a specific gravity (first specific gravity) is prepared. Next, as a third step (S3), the prepared retaining solution is introduced into an electrophoresis tank (device) having at least two electrodes. Then, as a fourth step (S4), the dispersion solution in which nanocarbon micelle groups that have a distribution of at least two electric charges and a specific gravity (second specific gravity) different from that of the retaining solution are dispersed is introduced into the electrophoresis tank in which the retaining solution is introduced. After that, as a fifth step (S5), the dispersed solution is separated into at least two nanocarbon micelle groups by applying direct current voltage on the electrophoresis tank and generating a resultant force of a driving force defined by a difference between the first specific gravity and the second specific gravity and an electrophoresis force defined by an electric field and the electric charges. As a final sixth step (S6), separated samples are fractioned.

Each of the steps will be explained in detail. In the first step (S1), a dispersion solution of nanoacrbon material is prepared. A nanocarbon material in this description is a carbon material constituted mainly by carbon atoms including such as a single-walled carbon nanotube, two-walled carbon nanotube, multi-walled carbon nanotube, carbon nanohorn, carbon nanotwist, graphene, fullerene, and the like. These carbon materials may be structured by pure carbon atoms or any proper functional group may be introduced so as to render the nanocarbon materials soluble to an organic or water solvent.

A dispersion solution of the nanocarbon (material) in this description means a solution that the nanocarbon material is dispersed in a solvent over a separating time. Water or heavy water is preferable for a solvent of the nanocarbon dispersion solution. However, water, heavy water, organic solvent, ionic liquid and the like may be available as far as it can disperse the nanocarbon material. It is preferable to use a nonionic surfactant as an assisting material (adjuvant agent) for dispersing the nanocarbon material in a solvent. However, a cationic surfactant, anionic surfactant, or other kind of assisting material for dispersion may be available. Or any suitable functional group may be introduced by substitution so as to render the nanocarbon material soluble. The assisting material is not necessarily be used.

A retaining solution for use in an electrophoresis tank is prepared in the second step (S2). The retaining solution is to prevent re-aggregation of the nanocarbon material and is to be prepared such that the specific gravity of the retaining solution becomes different from that of the nanocarbon material micelles. The composition of the retaining solution is preferred to be heavy water or water that is the same as that of the dispersion solution in which the nanocarbon micelle groups are dispersed. However, water, heavy water, organic solvent or ionic liquid and the like may be possible as far as it can retain the nanocarbon material micelles in a dispersed state. When using water or heavy water, it is preferable to add an assisting material (surfactant, etc.) for dispersion into the solution as is added into the nanocarbon dispersion solution. Other dispersion agent may be used, of course, or it is possible to add an organic solvent other than a surfactant so as to adjust the specific gravity of the solution.

When using a surfactant solution of water or heavy water as a solvent, the specific gravity of the solvent may be adjusted by adjusting the concentration of the surfactant. When using heavy water as a solvent and a polyoxyethylene (100) lauryl ether (product name: Brij®700, hereinafter called as "Brij700") which is a non-ionic surfactant as a surfactant, for example, the micelle composed of the SWCNT and the Brij700 has a smaller specific gravity than that of heavy water solution containing Brij700 by 1 wt %, and has a larger specific gravity than that of heavy water solution containing Brij700 by 0.5 wt % at a room temperature (25° C.). The difference between the specific gravities can be controlled by adjusting a concentration of a surfactant added into the retaining solution.

The retaining solution is introduced into the electrophoresis tank in the third step (S3). The electrophoresis tank is configured by an electrophoresis channel and electrodes. The electrophoresis channel may be shaped in any form so far as a direction applying direct current voltage is parallel to a direction in which a layer separation is conducted by a difference between the specific gravities of the retaining solution having a first specific gravity and a nanocarbon material micelle having a second specific gravity. Two examples of a structure of the electrophoresis tank will be explained below.

Figure 2:
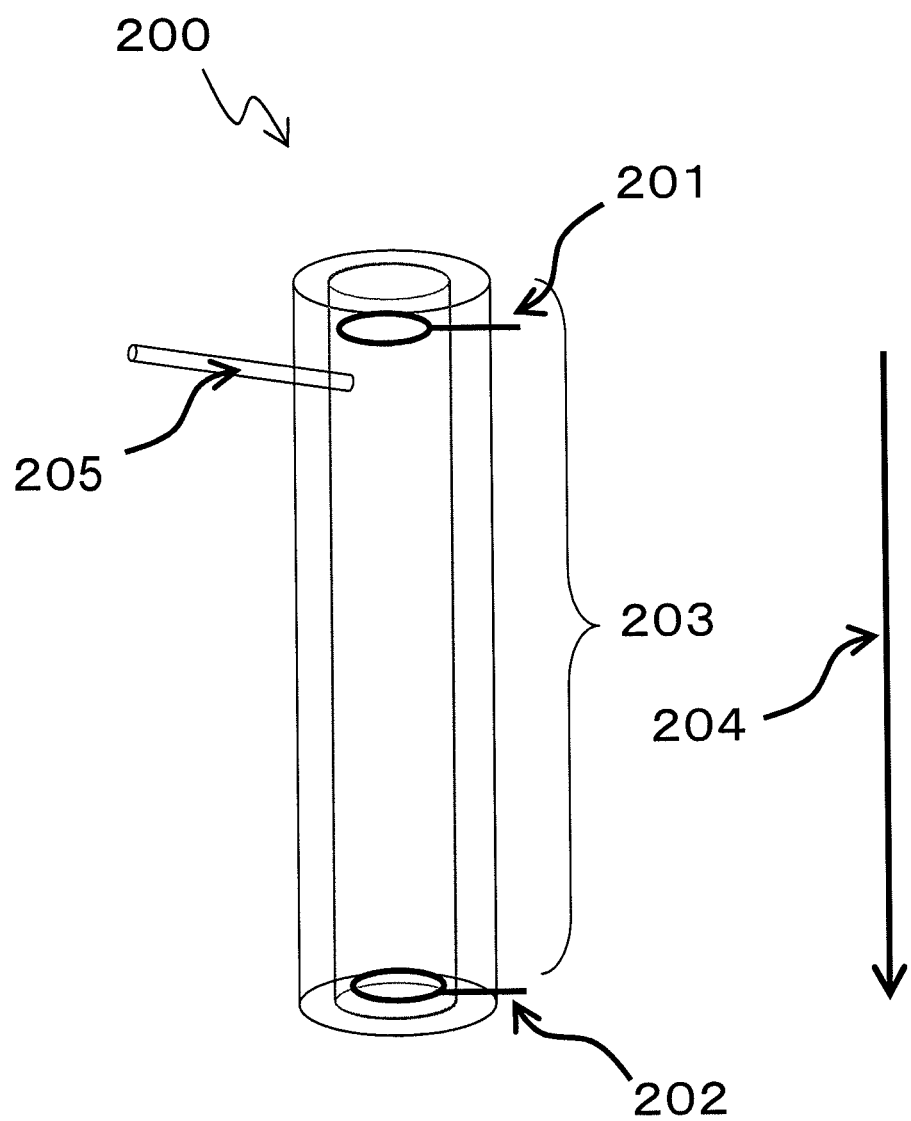
FIG. 2 is a schematic drawing of an electrophoresis tank (device) according to an example of the present invention.

FIG. 2 is a schematic drawing of an electrophoresis tank (device) 200 in which an electrophoresis channel is formed in parallel to the gravity. The electrophoresis channel 203 was provided with the electrophoresis tank 200 in a direction parallel to the gravity 204 as indicated by an arrow. An electrode (portion) 201 and an electrode (portion) 202 are provided at both ends of the channel 203. An inlet portion 205 for the nanocarbon micelle dispersion solution is provided at an edge of the channel. The position of the inlet portion for the nanocarbon micelle dispersion solution is a mere example and it is possible to dispose at any position in the channel.

Figure 3:
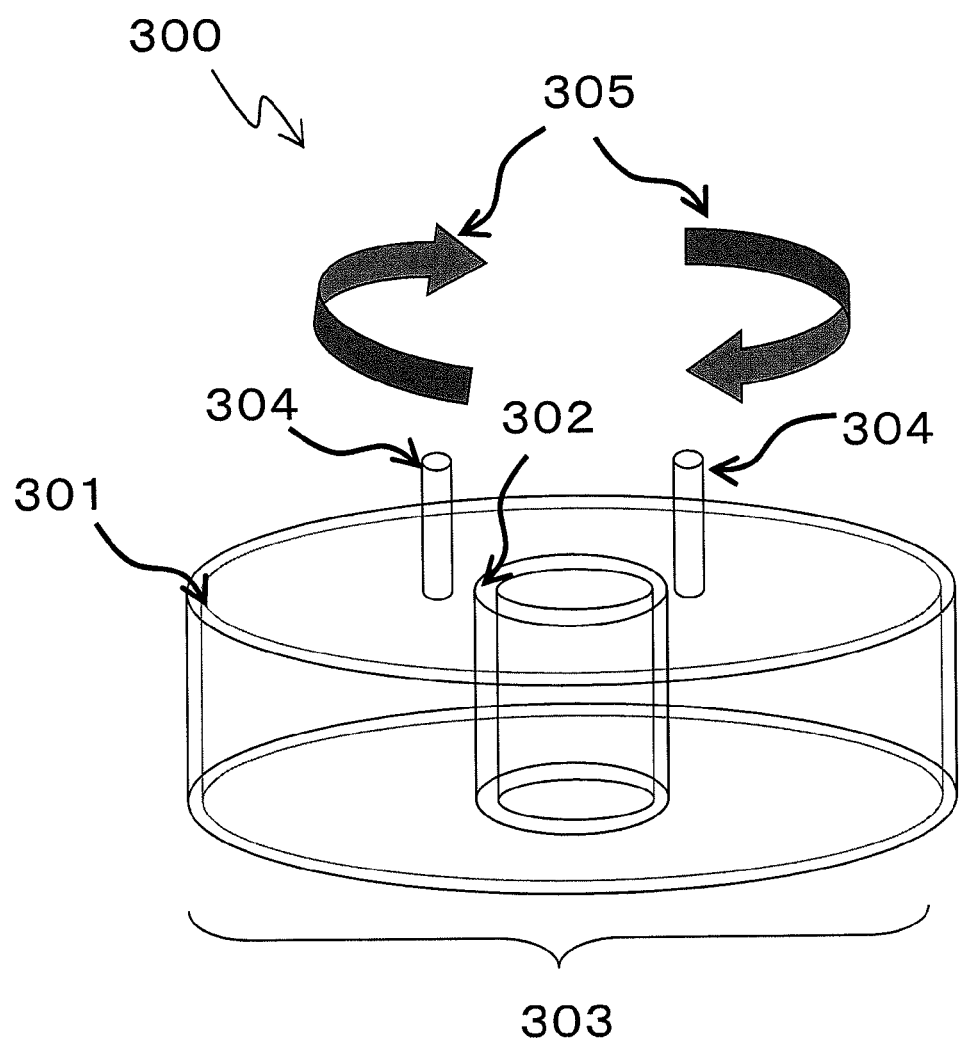
FIG. 3 is a schematic drawing of an electrophoresis tank (device) according to another example of the present invention, (a) to (c) of FIG. 4 are schematic drawings illustrating behaviors of a nanocarbon material under an electrophoresis.

An electrophoresis tank (device) 300, as a different example of an electrophoresis tank, that has a channel in a direction parallel to a centrifugal force will be explained with reference to FIG. 3. The electrophoresis tank 300 constantly rotates in a direction 305 as indicated by an arrow and a sample having larger specific gravity gathers at a peripheral region that is far from a center portion of a channel 303 and a sample having smaller specific gravity gathers at a region that is near to the center portion. An electrode (portion) 301 and an electrode (portion) 302 are provided at both ends of the channel 303. An inlet portion 304 for the nanocarbon micelle dispersion solution is provided at the center portion of the channel. The position of the inlet portion for the nanocarbon micelle dispersion solution is a mere example and it is possible to dispose at any position in the channel.

In the fourth step (S4), the dispersion solution of the nanocarbon micelle groups having at least two groups of electric charges and having a second specific gravity is introduced into the electrophoresis tank. The nanocarbon micelles dispersion solution is introduced from the inlet portion gently so as to prevent diffusion into the retaining solution. The introduction of the nanocarbon micelles dispersion solution may be carried out after starting of an application of the direct current voltage at the fifth step (S5).

The position to introduce the nanocarbon micelles dispersion solution is determined by the difference of the specific gravity from that of the retaining solution and magnitude of the applied direct current voltage.

In the following explanation, the "upper" means a direction to which a sample having smaller specific gravity migrates when the sample is introduced and the "lower" means a direction to which a sample having larger specific gravity migrates.

For example, single-walled carbon nanotube micelles dispersed in Brij700 as a surfactant has a lower specific gravity than that of heavy water solution containing Brij700 by 1 wt %, and has a larger specific gravity than that of heavy water solution containing Brij700 by 0.5 wt % at a room temperature (27° C.). Therefore, when using heavy water solution containing Brij700 by 1 wt % as a retaining solution, it is desirable to introduce the single-walled carbon nanotube micelles dispersed in Brij700 at the upper side of the retaining solution. On the other hand, when using heavy water solution containing Brij700 by 0.5 wt % as a retaining solution, it is desirable to introduce the single-walled carbon nanotube dispersion solution at the lower side of the retaining solution.

A direct current voltage is applied on the electrophoresis tank containing the solutions at the fifth step (S5). It is necessary to determine the optimum voltage based on the compositions of the solutions and electric charges of the nanocarbon micelles. When using water or heavy water as a solvent, it is possible to apply voltage from larger than 0 V to 1000 V between the most remote electrodes. Especially, when using water or heavy water as a solvent, it is preferable to apply voltage from larger than 0 V to 120 V so as to prevent electrolysis of the solvent.

The buoyant force and the force caused by an electric field that work on the nanocarbon micelles and the resultant force of these forces will be explained with reference to (a) to (c) of FIG. 4. Assuming that a nanocarbon micelle 401 has an electric charge $q1$, a nanocarbon micelle 402 has an electric charge $q2$ and a nanocarbon micelle 403 has an electric charge $q3$. And again, assuming that the nanocarbon micelles have the same length and the same diameter. The magnitude of the electric charges are $q1>q2>q3$.

When applying direct current voltage at the fifth step (S5), each nanocarbon micelle receives force generated by an electric field. The magnitude of the force exerted to the nanocarbon micelle is determined by the electric potential gradient of the electric field and the electric charge. The direction and magnitude of each electromagnetic force exerted to the nanocarbon micelle is illustrated by an arrow 404, 405 or 406 in FIG. 4. The buoyant force exerted to each nanocarbon micelle is determined by the mass and volume of the micelle. Thus the buoyant forces exerted to the nanocarbon micelles are identical. The direction and magnitude of the buoyant force of the micelle is illustrated by an arrow 407. The separating force according to the present invention is a resultant force of these forces. The resultant forces are illustrated as arrows 408, 409 (forces of upper direction and lower direction are balanced) and 410.

Figure 4:
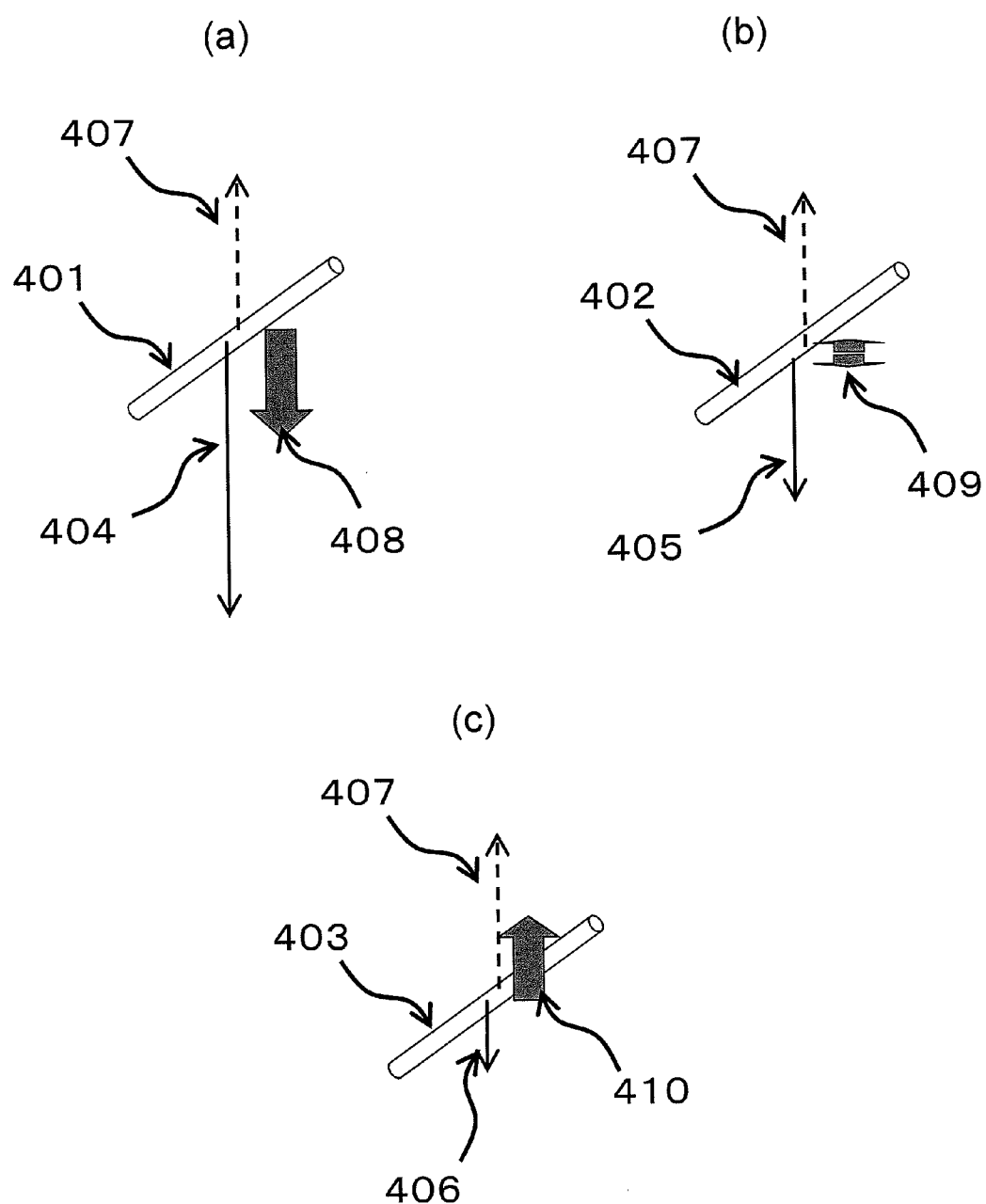

As shown in (b) of FIG. 4, when the electromagnetic force (arrow 405) generated by the electric potential gradient and the electric charge $q2$ and the buoyant force (arrow 407) become equal, the nanocarbon micelle is held in the channel. It becomes possible to hold each nanocarbon micelle in different regions by providing a plurality of electrodes in the channel and balancing the electromagnetic force and the buoyant force exerted to each nanocarbon micelle having electric charge $q1$, $q2$ or $q3$ by controlling the electric potential gradients in the channel between the electrodes. In addition, it becomes possible to concentrate nanocarbon micelles each having different electric charges or to fraction them continuously by introducing the solution continuously and separating the fraction continuously from each holding region.

Particularly, among the nanocarbon micelles, electric charges of the single-walled carbon nanotubes differ largely depending on the metallic characteristics and the semiconducting characteristics. That is because the present method is suitable particularly separating the metallic single-walled carbon nanotube and the semiconducting one. The amount of electric charge differs depending on a surface area even when the single-walled carbon nanotubes have the same characteristics. Thus, the amount of electric charge depends on a diameter of the nanocarbon tube. As a result, the present method makes it possible to separate carbon nanotubes having similar characteristics into groups of carbon nanotube having different diameters. The present method can be applied to other nonacarbon materials such as multi-walled carbon nanotubes, nanotwisters, and the like because electric charges of nanocarbon micelles are similarly utilized to separate them.

In the sixth step (S6), the separated solutions are fractioned. Any method can be used for fractioning as far as it does not mix or diffuse the separated samples. For example, a method to draw out every 1 ml calmly by a pipette after ceasing voltage application, a method to partition the channel and fraction the solution of each block, or by providing a tap around each electrode in the channel and introducing/drawing out continuously under application of voltage, and the like. Of course, other method may be possible to fraction the sample.

The samples fractioned by step 6 (S6) can be evaluated by the methods such as microscopic Raman spectroscopy (Raman spectrum change in Radial Breathing Mode region or change of Raman spectrum form in BWF region) and an ultraviolet/visible/near-infrared absorptiometry (change of peak form of absorption spectrum).

In a case using a single-walled carbon nanotube is used as a nanocarbon material, the separated sample may be also evaluated by fabricating a field effect transistor by the use of the separated sample and measuring its transistor characteristics.

EXAMPLES

Examples will be explained in the following description.

Example 1

A monodisperse solution was prepared by dispersing a single-walled carbon nanotube (HiPCO; Unidym) into heavy water as a dispersion solvent containing Brij700 as a nonionic surfactant by 1 wt %. The heavy water solution was prepared by mixing the single-walled carbon nanotube and heavy water containing surfactant and processed by ultrasonic using a Horn-type ultrasonic disintegrator (300 W output, 1 hour) so as to adjust the concentration of the single-walled carbon nanotube by 1 mg/ml. After that, the monodisperse solution of the single-walled carbon nanotube was separated from the solution by ultra-centrifuging the solution by 9000 rpm for 1.5 hours and fractioning 70% of the supernatant fluid.

Figure 5:
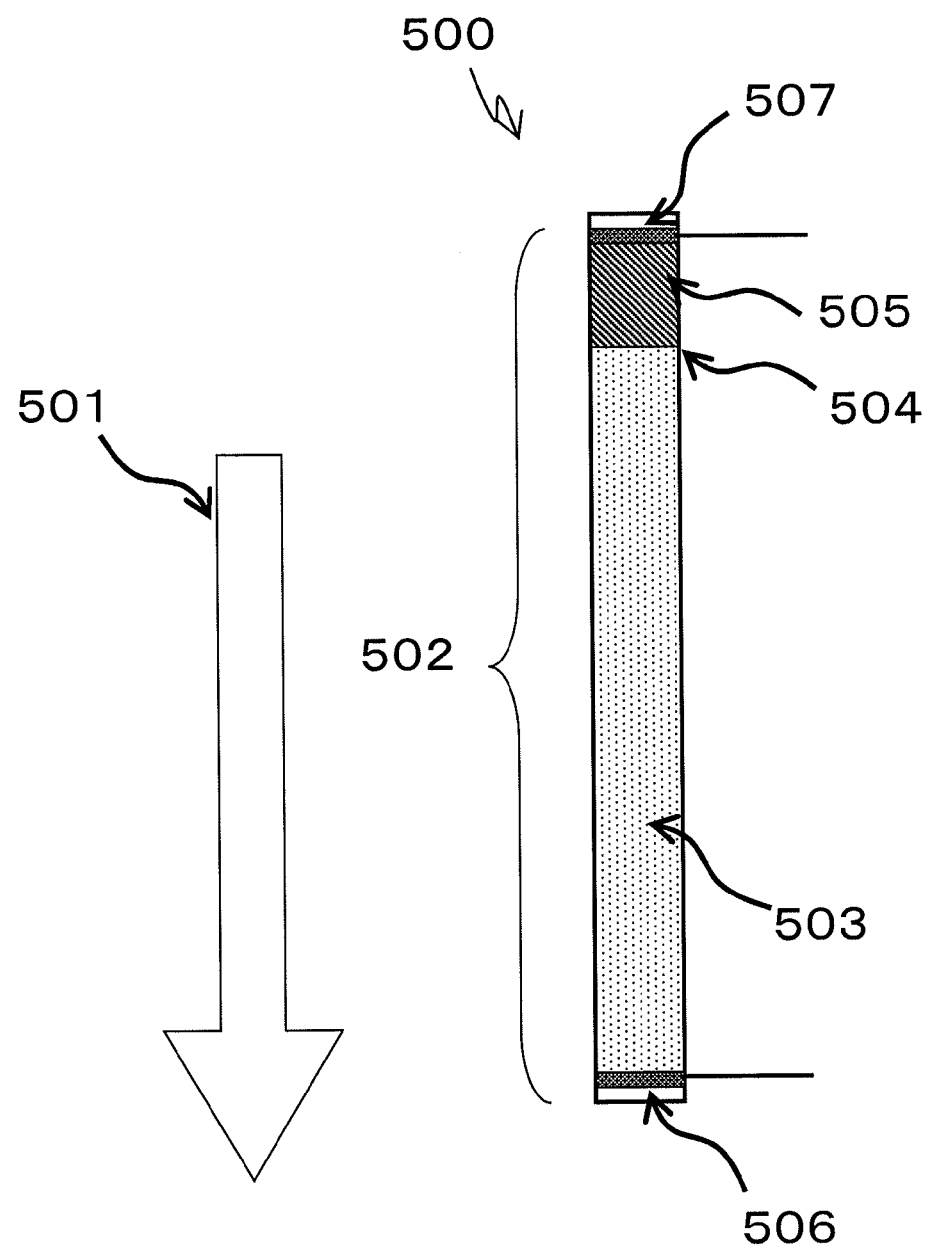
FIG. 5 is a schematic drawing illustrating an electrophoresis condition of an electrophoresis of example 1.

A heavy water/surfactant solution containing Brij700 by 1 wt % was prepared as a retaining solution and 8 ml of the retaining solution was poured into an electrophoresis tank. FIG. 5 is a drawing illustrating the electrophoresis tank. The electrophoresis tank (device) 500 has an electrophoresis channel 502 parallel to the gravity direction 501. The retaining solution has been introduced to be a retaining layer 503 in the electrophoresis tank 500. Approximately 2 ml of the monodisperse solution of the single-walled carbon nanotube was introduced on the retaining solution layer 503. The monodisperse single-walled carbon nanotube solution was quietly poured around a liquid surface 504 of the retaining solution layer. The monodisperse solution was carefully poured such that it did not diffuse and was held as a nanotube dispersed solution layer 505 on the surfactant solution (retaining solution layer 503).

A counter electrode (portion) 507 was lowered softly in the monodisperse solution so that an electrophoresis became possible. Platinum was used for the electrode. Direct current voltage of 65V was applied between the electrodes. The lower electrode (portion) 506 was an anode and the upper electrode (portion) 507 was a cathode. The voltage was applied for 6 hours.

Figure 6:
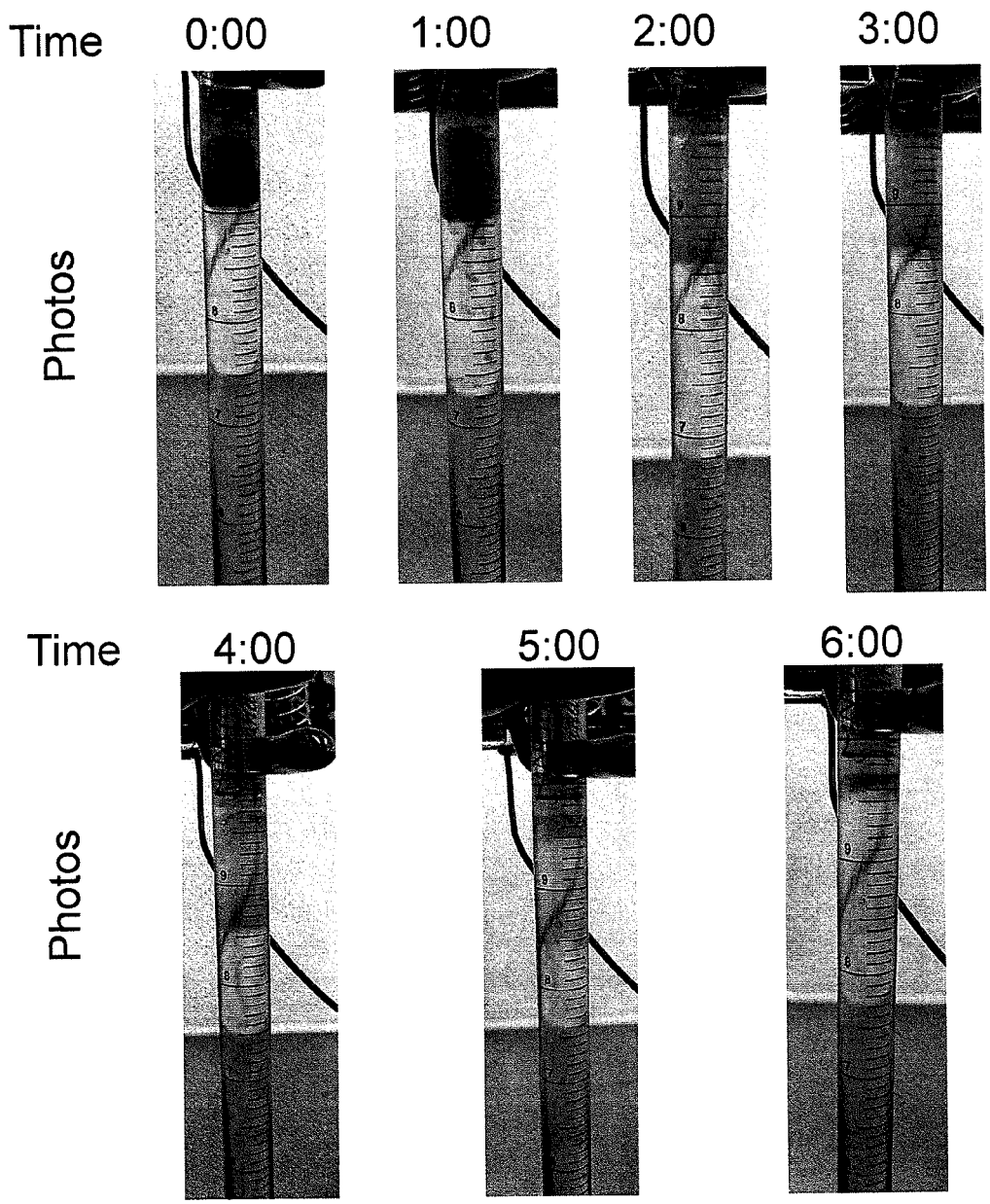
FIG. 6 is a set of photographs showing movement of a sample by the electrophoresis of example 1.

FIG. 6 show solution state at intervals of about 1 hour. A region of the single-walled carbon nanotube dispersion solution moved and extended from the layer formed at the cathode side to a lower part of the tank at the anode side with the lapse of time. The extended region of the dispersion solution colored after two hours from the start of application of voltage and gradation of the color was observed. Particularly, a width (height) of the region of the single-walled carbon nanotube dispersion solution extend toward the anode side with the lapse of time, and coloration in yellow-brown or red-brown color was observed at the region near the cathode. The main dispersion solution region extended and diffused and density of the color became thin with the lapse of further time, and red-brown regions aggregated around the cathode side and formed a belt region in red-brown near the platinum cathode electrode after 6 hours. After direct current voltage application for 6 hours, ten (10) parts were fractioned by 1 ml each from the top portion of the electrophoresis tank. Each fraction was designated as #0 to #9 from the cathode (top) side of the electrophoresis tank. The fractions and a solution before separation were analyzed from the viewpoint of degree of separation of metallic carbon nanotubes and semiconducting carbon nanotubes using microscopic Raman spectroscopy and ultraviolet/visible/near-infrared absorptiometry.

Figure 7:
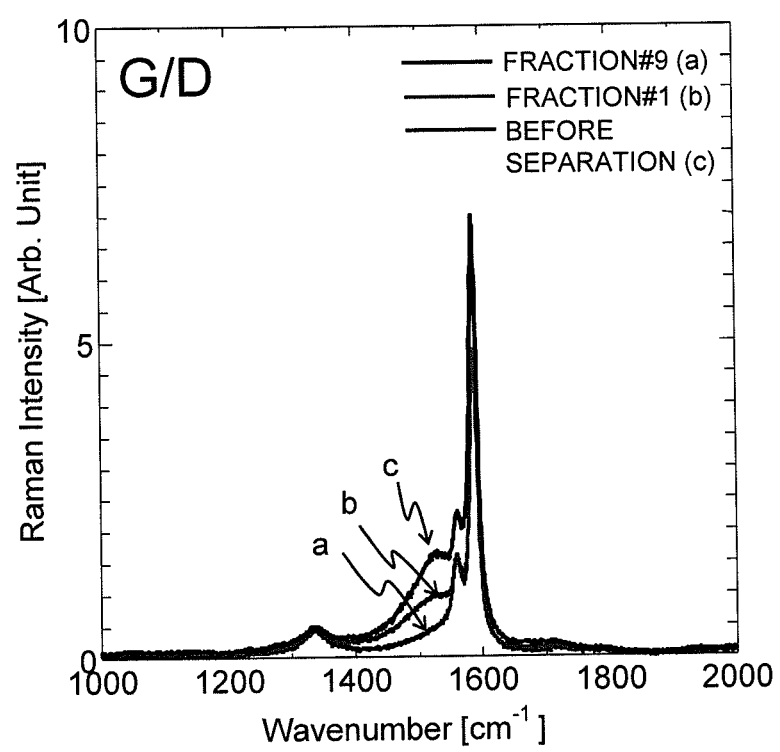
FIG. 7 is a graph showing a Raman spectrum of G-band and D-band of separated fractions.

FIG. 7 is a graph showing Raman spectrum of G-band and D-band, excited by radiation of 488 nm, of the sample before separation and the separated fractions #1 and #9. A peak around 1530 to 1560 cm$^{-1}$ is a BWF peak. The BWF peak was observed clearly in the sample before separation and the fraction #1. A peak strength ratio to the G-band was 0.25 by the sample before separation and 0.15 by the fraction #1. On the other hand, the peak around 1530 to 1560 cm$^{-1}$ was not observed clearly in the fraction #9. It suggests that the fraction #9 contains such small amount of metallic SWCNT that is difficult to detect its resonance excitation.

Figure 8:
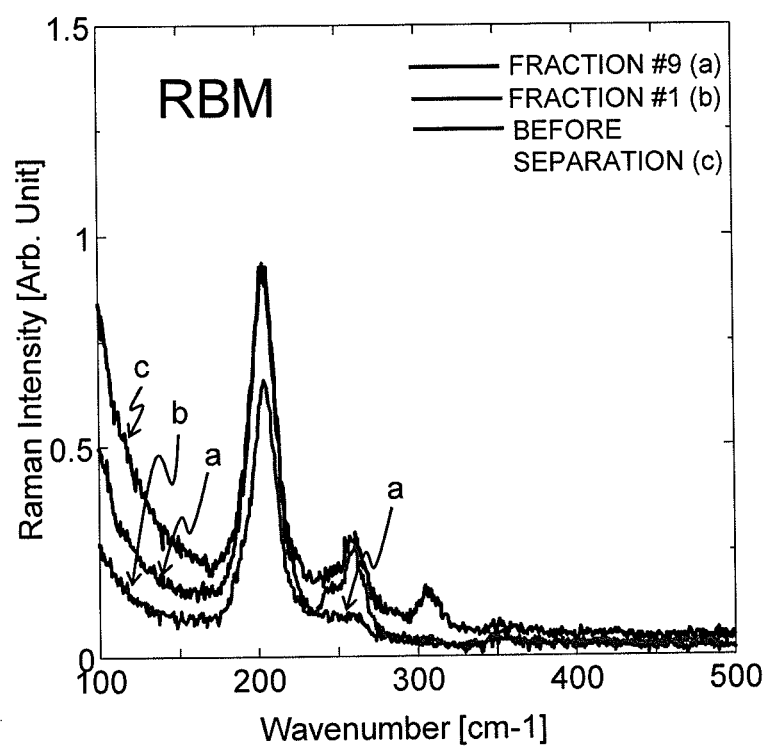
FIG. 8 is a graph showing a Raman spectrum of RBM-band of separated fractions.

FIG. 8 is a graph showing Raman spectrum of RBM region, excited by radiation of 488 nm, of the sample before separation and the separated fraction #1 and fraction #9. A large peak at 200 cm$^{-1}$ by the semiconducting SWCNT and peaks around 250 cm$^{-1}$ and 300 cm$^{1}$ by the metallic SWCNT were observed in the sample before separation.

In the fraction #1, a large peak of 200 cm$^{-1}$ by semiconducting SWCNT and a peak around 250 cm$^{-1}$ by metallic SWCNT are observed. In the fraction #9, a large peak of 200 cm$^{-1}$ by semiconducting SWCNT was observed and a small peak around 250 cm$^{-1}$ caused by metallic SWCNT was observed. Compared with the Raman spectrum of the sample before separation, it is confirmed that a peak ratio of the peak of metallic SWCNT to the peak of semiconducting SWCNT becomes small. Thus it is confirmed that the sample was separated into a fraction mainly containing semiconducting SWCNT and a fraction mainly containing metallic SWCNT.

Figure 9:
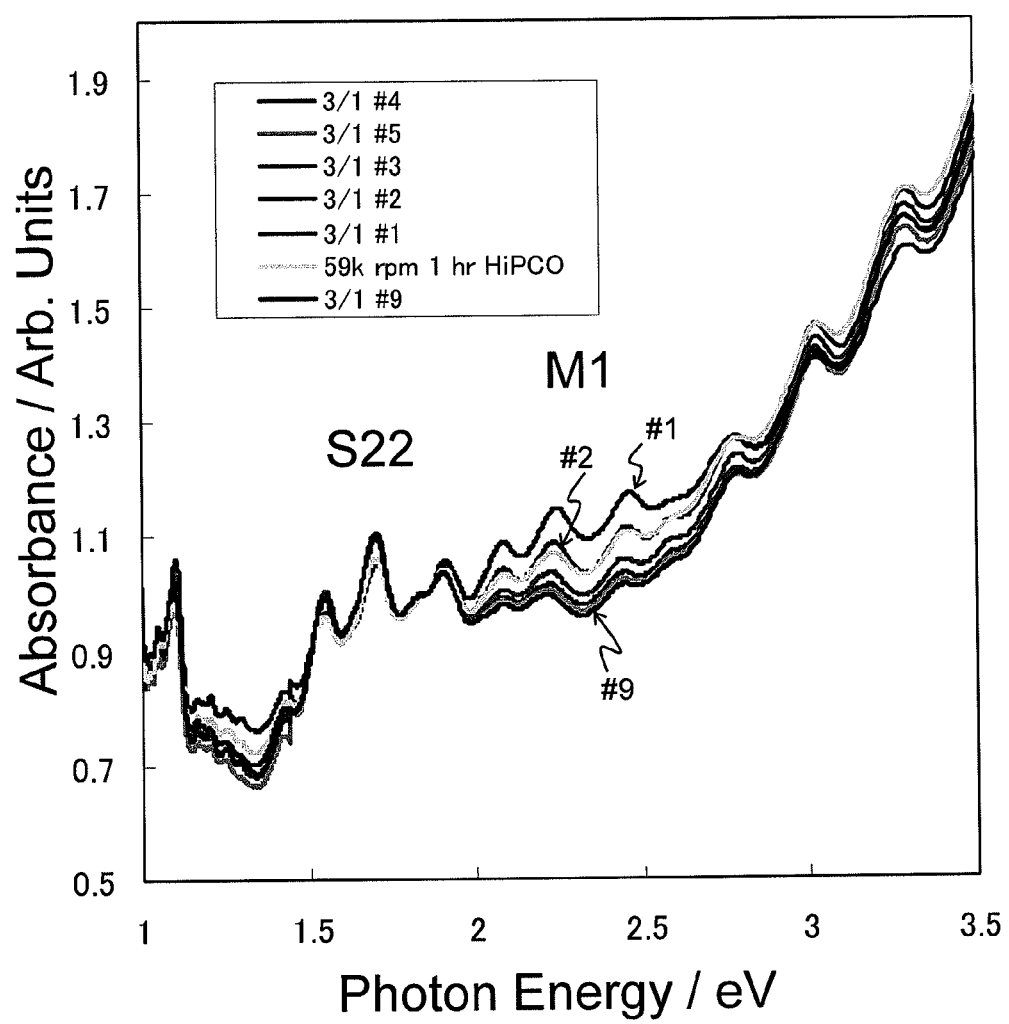
FIG. 9 is a graph showing a light absorption spectrum of separated fractions.

FIG. 9 is a light absorption spectrum of the sample before separation and separated fractions #1, #2#3, #4 and #9 in the range from 1 eV to 3.5 eV of excitation photon energy. Each spectrum was normalized at 1.9 eV. FIG. 9 shows that peak strength of M1 becomes small as the fraction number becomes large. Especially, fraction #9 has the smallest peak strength of M1. It suggests that a concentration of metallic SWCNT becomes small as the position of the fraction shifts to the anode side.

Let's think about a ratio of peak area of M1 to S22 of each fraction and an amount of metallic SWCNT in each fraction. Table 2 shows ratios of peak area of M1/S22 of the fractions when the M1/S22 ratio of peak area of the sample before separation is assumed to be 100. It is evident from Table 2 that a concentration of metallic SWCNT in the fraction decreases as the fraction closes to the anode side. As a result, a concentration of semiconducting SWCNT increases as the fraction closes to the anode side.

TABLE 2

| | Peak area ratio of metallic/semiconducting | Converted ratio of metallic CNT (before separation = 33) |
|---|---|---|
| Before separation | 100 | 33 |
| #1 | 142 | 40.92 |
| #2 | 103 | 33 |
| #3 | 76 | 27.3 |
| #4 | 72 | 26.1 |

TABLE 2-continued

| | Peak area ratio of metallic/semiconducting | Converted ratio of metallic CNT (before separation = 33) |
|---|---|---|
| #5 | 66 | 24.8 |
| ... | ... | ... |
| #9 | 56 | 21.4 |

The fraction #9, which is closest to the anode, showed the highest semiconducting SWCNT ratio. Based on the evaluation of semiconducting/metallic ratio from the peak area, it was estimated that the metallic SWCNT ratio was 21% and semiconducting SWCNT ratio was 79%. To the contrary, the fraction #1 that is closest to the anode[sic, cathode] showed the highest ratio of metallic SWCNT and the ratio of metallic SWCNT was 41% (semiconducting SWCNT ratio was 59%). The result proves that the semiconducting SWCNT and the metallic SWCNT have been separated.

Example 2

A nanocarbon monodisperse solution was prepared by dispersing a single-walled carbon nanotube (HiPCO; Unidym) into heavy water containing nonionic surfactant Brij700 as a dispersion agent. Heavy water solution containing Brij700 by 0.5 wt % was used as a retaining solution.

An introduction of the sample into the electrophoresis tank was carried out as follows. At first, 8 ml of the retaining solution was poured into the electrophoresis tank. Next, about 2 ml of the monodisperse SWCNT solution was introduced around the bottom level of the heavy water solution containing surfactant calmly using a pipette.

Figure 10:
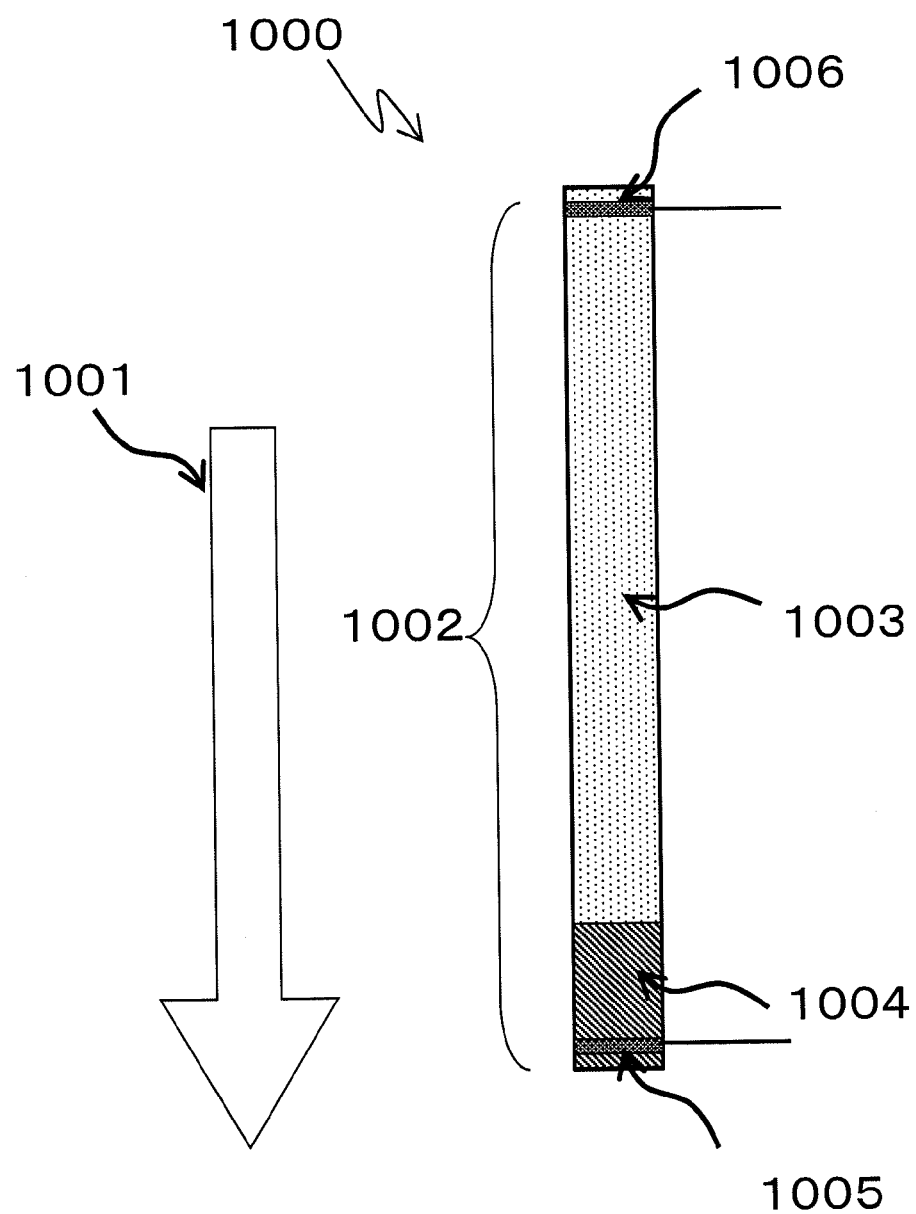
FIG. 10 is a schematic drawing illustrating an electrophoresis condition of an electrophoresis of example 2.

FIG. 10 shows the electrophoresis tank (device) 1000. The electrophoresis tank 1000 has a channel 1002 that is parallel to gravity direction 1001. The retaining solution 1003 was held in the electrophoresis tank 1000. About 2 ml of the monodisperse SWCNT solution was introduced in the retaining solution layer 1003. The monodisperse SWCNT solution was poured calmly into the region 1004 around the bottom level of the retaining solution. The dispersion solution was held as a layered region 1004 beneath the surfactant solution by pouring the solution calmly so as to prevent diffusion. An electrode (portion) 1005 is provided at the bottom of the channel. A counter electrode (portion) 1006 was dipped calmly into the retaining solution so as to carry out an electrophoresis. After arrangement of the sample solution into the electrophoresis tank 1000, direct voltage source was provided between the electrodes and direct voltage (65V) was applied. The electrode (portion) 1005 at the bottom side was a cathode and the counter electrode (portion) 1006 was an anode. The voltage was applied for 6 hours. After application of direct voltage for 6 hours, the solution was fractioned by 1 ml into ten (10) fractions from the top of the electrophoresis tank 1000. The fractions are designated as #0 to #9 from the anode (top) side of the electrophoresis tank 1000.

The fractions and a solution before separation were analyzed from the viewpoint of degree of separation of metallic SWCNT and semiconducting SWCNT using microscopic Raman spectroscopy and ultraviolet/visible/near-infrared absorptiometry, and obtained similar results to those of example 1.

Example 3

A nanocarbon monodisperse solution was prepared by dispersing a single-walled carbon nanotube (HiPCO; Unidym) into water containing nonionic surfactant Brij700 as a dispersion agent. Water solution containing Brij700 by 1 wt % was used as a retaining solution.

Figure 11:
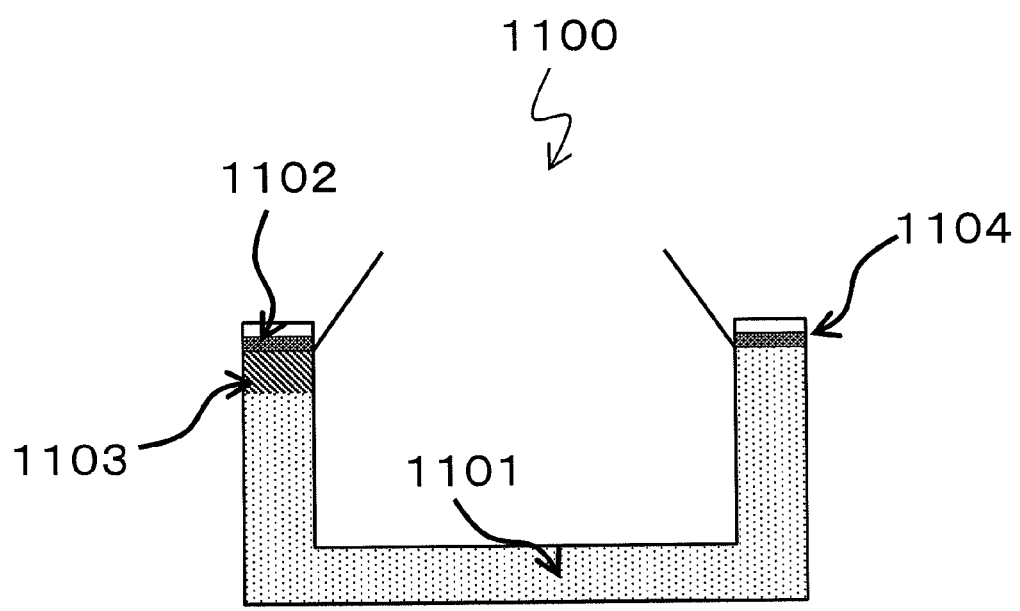
FIG. 11 is a schematic drawing illustrating an electrophoresis condition of an electrophoresis of example 3.

The sample arrangement into the electrophoresis tank (device) 1100, which is shown in FIG. 11, was carried out as follows. At first, 5 ml of the retaining solution was poured into the electrophoresis tank 1100 to form the retaining solution region 1101. Next, about 1 ml of the monodisperse SWCNT solution was introduced around the electrode (portion) 1102 of the heavy water solution containing surfactant calmly using a pipette. The monodisperse solution floated and was held in layer on the surfactant solution and formed the monodisperse SWCNT solution region 1103 by pouring the solution calmly so as to prevent diffusion. An electrode (portion) 1102 was dipped into the monodisperse solution region 1103 calmly. A counter electrode (portion) 1104 was dipped calmly at the opposite side. After arrangement of the sample solution into the electrophoresis tank 1100, direct voltage source was provided between the electrodes 1102 and 1104 and direct voltage (100V) was applied. The electrode 1102 at the side of the SWCNT solution was a cathode and the counter electrode 1104 was an anode. The voltage was applied for 6 hours. After application of direct voltage for 6 hours, the solution was fractioned by 1 ml into five (5) fractions from the top of the electrophoresis tank 1100. The fractions are designated as #1 to #5 from the anode side of the electrophoresis tank 1100.

The fractions and a solution before separation were analyzed from the viewpoint of degree of separation of metallic SWCNT and semiconducting SWCNT using microscopic Raman spectroscopy and ultraviolet/visible/near-infrared absorptiometry, and obtained similar results to those of example 1. As is proved by this example, the whole channel is not necessarily parallel to the gravity or centrifuging force but it is enough at least a part of the channel is parallel.

As a result, the present invention is superior to prior arts as shown in Table 3. In Table 1, the symbols ⊚, O, Δ and X are arranged in order of good results. That is, ⊚ indicates the best result and X indicates worst result.

TABLE 3

| | Mass-productivity | Operability | Cost |
|---|---|---|---|
| Dielectrophoresis | X | X | X |
| Density-differentiation centrifugation | X | X | X |
| DNA wrapping | X | X | Δ |
| Gel-electrophoresis | X | Δ | O |
| Gel adsorption | Δ | O | ⊚ |
| Present invention | ⊚ | ⊚ | ⊚ |

It is to be understood that the invention is not limited to the specific examples and that modifications may be done without departing the gist and scope of the present invention.

The contents disclosed in Patent Documents are hereby incorporated by reference herein in their entirety. It should be noted that other objects, features and aspects of the present invention will become apparent in the entire disclosure (including claims) and that modifications may be done without departing the gist and scope of the present invention as disclosed herein and claimed as appended herewith. Also it should be noted that any combination of the disclosed and/or claimed elements, matters and/or items may fall under the modifications aforementioned.

EXPLANATIONS OF SYMBOLS 200 electrophoresis tank (device)
201, 202 electrode (portion)
203 electrophoresis channel
204 gravity direction
205 inlet
300 electrophoresis tank (device)
301, 302 electrode (portion)
303 channel
304 inlet
305 rotation direction
401 nanocarbon micelle having electric charge q1
402 nanocarbon micelle having electric charge q2
403 nanocarbon micelle having electric charge q3
404 (direction and magnitude of) electromagnetic force exerted on nanocarbon micelle having electric charge q1
405 (direction and magnitude of) electromagnetic force exerted on nanocarbon micelle having electric charge q2
406 (direction and magnitude of) electromagnetic force exerted on nanocarbon micelle having electric charge q3
407 (direction and magnitude of) buoyant force exerted on each nanocarbon micelle
408 (direction and magnitude of) driving force exerted on nanocarbon micelle having electric charge q1
409 (direction and magnitude of) driving force exerted on nanocarbon micelle having electric charge q2
410 (direction and magnitude of) driving force exerted on nanocarbon micelle having electric charge q3
500 electrophoresis tank (device)
501 gravity direction
502 channel
503 retaining solution layer
504 retaining solution surface
505 nanotube dispersion solution layer
506, 507 electrode (portion)
1000 electrophoresis tank (device)
1001 gravity direction
1002 channel
1003 retaining solution layer
1004 nanotube dispersion solution layer
1005, 1006 electrode (portion)
1100 electrophoresis tank (device)
1101 retaining solution region
1102, 1104 electrode (portion)
1103 nanotube dispersion solution region

What is claimed is:

1. A method for separating a nanocarbon material comprising:
   introducing a dispersion solution of a nanocarbon material that is dispersed into nanocarbon micelle groups having a plurality of different electric charges and a retaining solution having a different specific gravity from that of the nanocarbon material into an electrophoresis tank to form a layered state disposed in layers in a predetermined direction, and
   separating the nanocarbon micelle groups into at least two nanocarbon micelle groups by applying direct current voltage in series across the dispersion solution and the retaining solution that had both been introduced and disposed in layers.

2. The method of claim 1, wherein the step of introducing the dispersion solution and the retaining solution in layers comprises:
   preparing the dispersion solution and the retaining solution,
   introducing the retaining solution into the electrophoresis tank, and
   introducing the dispersion solution into the electrophoresis tank.

3. The method of claim 1, wherein the predetermined direction is a direction parallel to gravity or centrifugal force.

4. The method of claim 1, wherein each of the retaining solution and the dispersion solution comprises a component selected from a group consisting of water, heavy water, organic solvent and ionic liquid as a solvent component.

5. The method of claim 4, wherein the retaining solution and the dispersion solution further comprises a surfactant as an adjuvant agent for dispersion.

6. The method of one claim 1, wherein the nanocarbon material is a multi-walled carbon nanotube.

7. The method of claim 6, wherein the nanocarbon material is a two-walled carbon nanotube.

8. The method of claim 1, wherein the nanocarbon material is a single-walled carbon nanotube.

9. The method of claim 8, wherein the nanocarbon micelle groups are composed of a micelle group comprising a semiconducting single-walled carbon nanotube and a micelle group comprising a metallic single-walled carbon nanotube.

10. The method of claim 1, wherein a number of electrodes of the electrophoresis tank is two.

11. A separation device of a nanocarbon material comprising:
    an electrophoresis channel portion,
    an inlet portion for introducing a dispersion solution of a nanocarbon material that is dispersed into nanocarbon micelle groups having a plurality of different electric charges and a retaining solution having a different specific gravity from that of the nanocarbon material into the electrophoresis channel portion in layers, the inlet portion being disposed so as to introduce the dispersion solution at an intervening position of the retaining solution disposed between an electrode at a highest position and an electrode at a lowest position, and
    at least two electrodes disposed opposingly so as to apply direct current voltage in series across the dispersion solution and the retaining solution that had both been introduced in layers.

12. The separation device of claim 11, wherein at least one part of the electrophoresis channel portion is disposed in a direction parallel to gravity or centrifugal force.

13. The separation device of claim 11, wherein the nanocarbon material is a multi-walled carbon nanotube.

14. The separation device of claim 13, wherein the nanocarbon material is a two-walled carbon nanotube.

15. The separation device of claim 11, wherein the nanocarbon material is a single-walled carbon nanotube.

16. The separation device of claim 15, wherein the nanocarbon micelle groups are composed of a micelle group comprising a semiconducting single-walled carbon nanotube and a micelle group comprising a metallic single-walled carbon nanotube.

17. The separation device of claim 11, wherein the opposing electrodes are two electrodes which are opposing to each other.

18. The separation device of claim 11, wherein the inlet portion is disposed so as to introduce the dispersion solution between an upper layer of the retaining solution and an electrode at a highest position.

19. The separation device of claim 11, wherein the inlet portion is disposed so as to introduce the dispersion solution between a lower layer of the retaining solution and an electrode at a lowest position.

20. A separation device of a nanocarbon material comprising:
- an electrophoresis channel portion,
- an inlet portion so as to introduce a dispersion solution of a nanocarbon material that is dispersed into nanocarbon micelle groups having a plurality of different electric charges and a retaining solution having a different specific gravity from that of the nanocarbon material into the electrophoresis channel portion in layers, the inlet portion is disposed so as to introduce the dispersion solution between an upper layer of the retaining solution and an electrode at a highest position or between a lower layer of the retaining solution and an electrode at a lowest position, and
- at least two electrodes disposed opposingly so as to apply direct current voltage in series across the dispersion solution and the retaining solution that had both been introduced in layers.

* * * * *